US012650498B2

(12) United States Patent
Tubert et al.

(10) Patent No.: US 12,650,498 B2
(45) Date of Patent: Jun. 9, 2026

(54) INDIRECT TIME OF FLIGHT SENSOR AND METHOD

(71) Applicants: STMicroelectronics (Grenoble 2) SAS, Grenoble (FR); STMicroelectronics (Crolles 2) SAS, Crolles (FR)

(72) Inventors: Cedric Tubert, Saint-Egreve (FR); Pierre Malinge, Bernin (FR); Matteo Maria Vignetti, Aix les Bains (FR)

(73) Assignees: STMicroelectronics (Grenoble 2) SAS, Grenoble (FR); STMicroelectronics (Crolles 2) SAS, Crolles (FR)

( * ) Notice: Subject to any disclaimer, the term of this patent is extended or adjusted under 35 U.S.C. 154(b) by 1058 days.

(21) Appl. No.: 17/652,177

(22) Filed: Feb. 23, 2022

(65) Prior Publication Data

US 2022/0276356 A1      Sep. 1, 2022

(30) Foreign Application Priority Data

Feb. 26, 2021    (FR) ...................................... 2101914

(51) Int. Cl.
G01S 7/4865        (2020.01)
G01S 7/4861        (2020.01)
G01S 17/08         (2006.01)

(52) U.S. Cl.
CPC .......... G01S 7/4865 (2013.01); G01S 7/4861 (2013.01); G01S 17/08 (2013.01)

(58) Field of Classification Search
CPC ..................................................... H04N 25/583
See application file for complete search history.

(56) References Cited

U.S. PATENT DOCUMENTS

| | | | |
|---|---|---|---|
| 2010/0309333 A1* | 12/2010 | Smith .................. | H04N 23/741 348/E5.037 |
| 2014/0104397 A1 | 4/2014 | Shin et al. | |
| 2014/0217474 A1 | 8/2014 | Lee et al. | |
| 2015/0281618 A1* | 10/2015 | Saito ..................... | G01S 17/894 348/303 |
| 2018/0241952 A1* | 8/2018 | Haraguchi ............. | H04N 25/00 |
| 2019/0148448 A1 | 5/2019 | Lee | |
| 2021/0183018 A1 | 6/2021 | Tubert et al. | |
| 2021/0255291 A1 | 8/2021 | Tubert | |

* cited by examiner

*Primary Examiner* — Thanh Luu
(74) *Attorney, Agent, or Firm* — Slater Matsil, LLP

(57) ABSTRACT

The present description concerns a sensor and method. Each pixel of the sensor comprises assemblies each including a memory area and a transfer device coupling the memory area to a photoconversion area, and a device for resetting the memory areas. The sensor includes a first circuit controlling the transfer devices and a second circuit controlling the reset devices. During each integration phase, the second circuit orders the end of a phase of reset of the memory areas of first pixels at the beginning of the integration phase and the end of a phase of reset of the memory areas of second pixels at a time subsequent to the beginning of the integration phase.

20 Claims, 7 Drawing Sheets

INDIRECT TIME OF FLIGHT SENSOR AND METHOD

CROSS-REFERENCE TO RELATED APPLICATIONS

This application claims the benefit of French Patent Application No. 2101914, filed on Feb. 26, 2021, which application is hereby incorporated herein by reference.

TECHNICAL FIELD

The present disclosure generally concerns electronic circuits and methods, and more particularly indirect time-of-flight (iToF) sensors and methods.

BACKGROUND iToF sensors comprise an array of pixels organized in rows and in columns. In known iToF sensors, each integration phase is implemented simultaneously for all the pixels of the array, each integration phase then starting and ending at the same times for all the pixels of the array. Each integration phase is further followed by a readout phase during which the pixel rows are read one after the others, where all the pixels of a row being read are read simultaneously.

In known iToF sensors, during each integration phase common to all pixels, all pixels are controlled identically. Thus, in known iToF sensors, during each integration phase, all the pixels integrate light for the same duration which corresponds to the duration of the integration phase.

The distance range over which each of these known iToF sensors is capable of operating, that is, of measuring a distance between the sensor and a point of a scene to be captured, is then determined by the duration of the integration phase.

SUMMARY

There is a need to overcome all or part of the disadvantages of known iToF sensors.

For example, there is a need to increase the distance range over which an iToF sensor is capable of operating with respect to that of a known iToF.

An embodiment overcomes all or part of the disadvantages of known iToF sensors.

For example, an embodiment enables to increase the distance range over which an iToF sensor is capable of operating with respect to that of a known iToF sensor.

An embodiment provides an indirect time-of-flight sensor comprising an array of pixels organized in rows and in columns, each pixel comprising a photoconversion area, at least two assemblies, each comprising a memory area and a transfer device coupling the memory area to the photoconversion area, and a device for resetting the memory areas of the pixel. The sensor further comprises a first circuit configured to control the pixel transfer devices, and a second circuit configured to control the devices for resetting the memory areas of the pixels. The second circuit is configured, during each integration phase implemented by the sensor, to order the end of a phase of reset of the memory areas of first pixels of the array at the beginning of the integration phase, and to order the end of a phase of reset of the memory areas of second pixels of the array at a first time subsequent to the beginning of the integration phase.

According to an embodiment, the second circuit is configured to control the devices for resetting the memory areas of the first pixels by means of first reset signals and the devices for resetting the memory areas of the second pixels by means of second reset signals, and the sensor comprises conductive lines parallel to the pixel rows and configured to transmit the reset signals to the pixels of the array.

According to an embodiment, the pixel rows comprise first rows and second rows, preferably alternated, each first row only comprising first pixels and each second row only comprising second pixels.

According to an embodiment, the first circuit is configured, during each integration phase, to identically control all the pixels of the array.

According to an embodiment, the second circuit is configured to control the transfer devices of each first pixel by means of first transfer signals and the transfer devices of each second pixel by means of second transfer signals, and the sensor comprises conductive lines parallel to the pixel rows and configured to transmit the transfer signals to the pixels of the array.

According to an embodiment, the columns of pixels comprise first columns and second columns, preferably alternated, each first column only comprising first pixels and each second column only comprising second pixels.

According to an embodiment, the first circuit is configured, during each integration phase, to identically control all the pixels of the array.

According to an embodiment, the first circuit is configured to control the transfer devices of each first pixel by means of first transfer signals and the transfer devices of each second pixel by means of second transfer signals, and the sensor comprises conductive lines parallel to the columns of the array and configured to transmit the transfer signals to the pixels of the array.

According to an embodiment, each column of pixels comprises an alternation of first pixels and of second pixels, and each row of pixels comprises an alternation of first pixels and of second pixels.

According to an embodiment, the first circuit is configured, during each integration phase, to identically control all the pixels of the array.

According to an embodiment, the pixel columns comprise first columns and second columns, preferably alternated, each first column only comprising first pixels or second pixels, and each second column comprising an alternation of first pixels and of second pixels.

According to an embodiment, the second circuit is further configured, during each integration phase, to order the end of a phase of reset of the memory areas of third pixels of the array at a second time subsequent to the first time, and the second circuit is configured to control the devices for resetting the memory areas of the third pixels by means of third reset signals.

According to an embodiment, the pixel columns comprise first columns and second columns, preferably alternated, each first column only comprising first pixels, and each second column only comprising second pixels and third pixels, preferably alternated. The first circuit is configured to control the transfer devices of each first pixel by means of first transfer signals, and the transfer devices of each second pixel and of each third pixel by means of second transfer signals, and the sensor comprises conductive lines parallel to the pixel columns and configured to transmit the transfer signals to the pixels of the array.

According to an embodiment, the pixel rows comprise first rows and second rows, preferably alternated, each first row only comprises first pixels, and each second row only comprises second pixels and third pixels, preferably alternated. The first circuit is configured to control the transfer devices of each first pixel by means of first transfer signals, and the transfer devices of each second pixel and of each third pixel by means of second transfer signals, and the sensor comprises conductive lines parallel to the pixel rows and configured to transmit the transfer signals to the pixels of the array.

According to an embodiment, all the pixels of the array are identical.

An embodiment provides a method of operating an indirect time-of-flight sensor comprising an array of pixels organized in rows and in columns, each pixel comprising a photoconversion area, at least two assemblies, each comprising a memory area and a transfer device coupling the memory area to the photoconversion area, and a device for resetting the memory areas of the pixel, where the method comprises controlling, by a first circuit, the transfer devices of the pixels, controlling, by a second circuit, the devices for resetting the memory areas of the pixels, and, during each integration phase implemented by the sensor, ordering, by the second circuit, an end of a phase of reset of the memory areas of first pixels of the array at a beginning of the integration phase, and ordering, by the second circuit, an end of a phase of reset of the memory areas of second pixels of the array at a first time subsequent to the beginning of the integration phase.

According to an embodiment, the method further comprises controlling, by the second circuit, the devices for resetting the memory areas of the first pixels by means of first reset signals and the devices for resetting the memory areas of the second pixels by means of second reset signals, and transmitting, by conductive lines parallel to the pixel rows, the first and second reset signals to the pixels of the array.

According to an embodiment, the method further comprises ordering, by the second circuit during each integration phase, the end of a phase of reset of the memory areas of third pixels of the array at a second time subsequent to the first time, and controlling, by the second circuit, the devices for resetting the memory areas of the third pixels by means of third reset signals.

According to an embodiment, wherein the columns of pixels comprise alternating first columns and second columns, each first column only comprises first pixels, and each second column only comprises alternating second pixels and third pixels, the method further comprises controlling, by the first circuit, the transfer devices of each first pixel by means of first transfer signals, and the transfer devices of each second pixel and of each third pixel by means of second transfer signals, and transmitting, by second conductive lines parallel to the pixel columns, the transfer signals to the pixels of the array.

According to an embodiment, wherein the rows of pixels comprise alternating first rows and second rows, each first row only comprises first pixels, and each second row only comprises alternating second pixels and third pixels, the method further comprises controlling, by the first circuit, the transfer devices of each first pixel by means of first transfer signals, and the transfer devices of each second pixel and of each third pixel by means of second transfer signals, and transmitting, by second conductive lines parallel to the pixel rows, the transfer signals to the pixels of the array.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the different known pixels adapted to an implementation in an iToF sensor and the known implementations of a readout phase in an iToF sensor have not been detailed, the described embodiments and variants being compatible with these known pixels and these known implementations of a readout phase.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
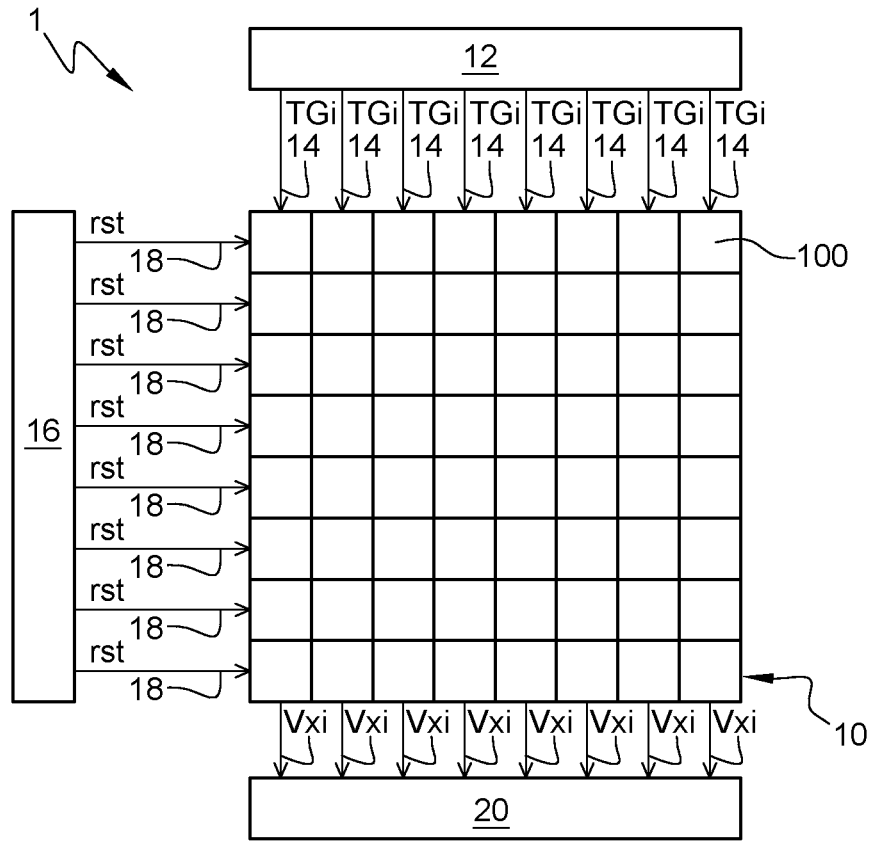
FIG. 1 schematically shows an example of an iToF sensor.

FIG. 1 schematically shows an example of an iToF sensor 1.

Sensor 1 comprises an array 10 of pixels 100, a single pixel 10o being referenced in FIG. 1 to avoid overloading the drawing. Pixels 10o are all identical and are organized in rows and in columns. In FIG. 1, the rows are horizontal and the columns are vertical.

Figure 2:
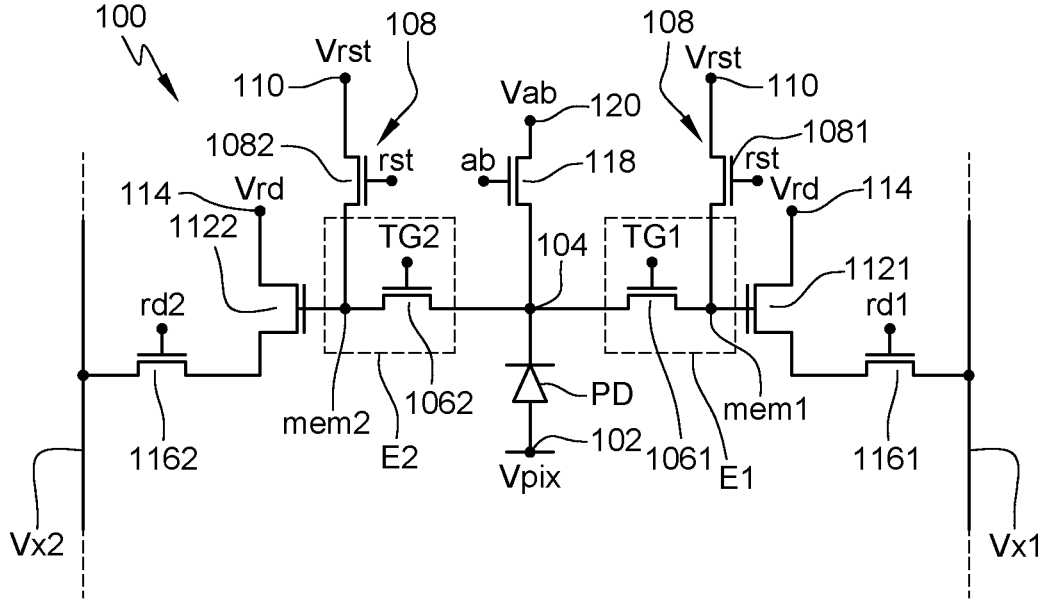
FIG. 2 schematically shows an example of a pixel of an iToF sensor.

FIG. 2 schematically shows an example of a pixel 100.

As all the usual pixels adapted to an implementation in an iToF sensor, that is, all the usual iToF pixels, pixel 100 comprises a photosensitive area PD, for example, a photodiode, preferably a pinned photodiode. A first terminal of area PD, in this example, the anode of photodiode PD, is coupled, for example, connected, to a node 102 of application of a bias potential Vpix, a second terminal of area PD, for example, the cathode of photodiode PD, being coupled, for example, connected, to an inner node 104 of pixel 100.

Potential Vpix is the bias potential applied to a semiconductor substrate having pixel 100 implemented inside and on top of it. In other words, potential Vpix is the bias potential of the substrate of pixel 100. As an example, in an iToF sensor comprising an array of pixels 100, all pixels are implemented inside and on top of the same semiconductor substrate.

Like all usual iToF pixels, pixel 100 further comprises an integral number N of identical assemblies Ei, i being an integer in the range from 1 to N. In the example of FIG. 2, N is equal to 2, although, in other examples, not illustrated, N may take values greater than 2. Thus, in the example of FIG. 2, pixel 100 comprises an assembly E1 and an assembly E2, delimited by dotted lines in FIG. 2.

Each assembly Ei comprises a memory area memi, for example, a pinned memory, a capacitive element, or a capacitive node. In FIG. 2, each memory area memi is schematically represented by a node. Each assembly Ei further comprises a transfer device or circuit 106i. In each assembly EI, transfer device 106i, for example, a MOS (metal oxide semiconductor) transistor or a transfer gate, couples area memi to area PD or, in other words, couples area memi to node 104. Each transfer device 106i is controlled by a corresponding signal TGi. In the example of FIG. 2, assembly E1, respectively E2, comprises an area mem1, respectively mem2, coupled to node 104 by device 1061, respectively 1062.

Like all usual iToF pixels, pixel 100 further comprises a device or circuit 108 for resetting the areas memi of pixel 100. Device 108 is configured, when it is in an active state, to reset the areas memi of the pixel. When device 108 is inactive, the state of each memory memi of pixel 100 is determined by the quantity of light received by area PD and by switchings between the off state and the on state of the device 106i associated with this memory memi. Device 108 is, in this example, controlled by a signal rst.

In the example of FIG. 2, the device 108 of pixel 100 comprises one MOS transistor 108i for each assembly Ei. Each transistor 108i is controlled by the signal that it receives on its gate, in this example signal rst. Transistor 108i couples the corresponding memory area memi to a node 110 of application of a reset potential Vrst. Each transistor 108i is controlled by reset signal rst. In this example where N is equal to 2, pixel 100 comprises a transistor 1081 coupling area mem1 to node 110, and a transistor 1082 coupling area mem2 to node 110.

Like all usual iToF sensors, pixel 100 further comprises a readout device. The readout device is configured to selectively read from each of the areas memi of pixel 100. In other words, the readout device is configured to selectively deliver, for each memory memi of the pixel, a signal representative of the state of memory memi to a conductive readout line Vxi. As an example, the readout device of pixel 100 is controlled by signals rdi, each signal rdi controlling the reading from the corresponding area memi.

In the example of FIG. 2, the readout device of pixel 100 comprises, for each assembly Ei, a MOS transistor 112i assembled as a follower source. Transistor 112i has its source coupled to a conductive readout line Vxi, its drain coupled, for example, connected, to a node 114 of application of a readout potential Vrd, and its gate coupled, for example connected, to the corresponding area memi. Potential Vrd is for example identical to potential Vrst. The readout device of pixel 100 further comprises, for each assembly Ei, a readout MOS transistor 116i. Each transistor 116i is configured to selectively couple the corresponding area memi to a corresponding line Vxi, transistor 116i being, for example, connected between the source of the corresponding transistor 112i and the corresponding line Vxi. Each transistor 116i receives the corresponding signal rdi on its gate.

Like all usual iToF pixels, and as is especially the case in FIG. 2, pixel 100 may comprise a device for resetting area PD. In the example of FIG. 2, the device for resetting area PD is a MOS transistor 118 coupling area PD, and more particularly node 104, to a node 120 of application of a reset potential Vab, the gate of transistor 118 receiving a control signal ab. Preferably, the device for resetting area PD also has the role of an anti-blooming device.

Referring again to FIG. 1, sensor 1 comprises a circuit 12 configured to control the transfer devices 106i (FIG. 2) of pixels 100. Circuit 12 is configured to identically control all pixels 100. In other words, circuit 12 is configured to deliver signals TGi to pixels 100, these signals being identical for all the pixels 100 of array 10. For example, in the case of pixels 100 each comprising two assemblies E1 and E2 (FIG. 2), circuit 12 is configured to deliver the same signal TG1 to all devices 1061, and the same signal TG2 to all devices 1062.

In the example of FIG. 1, the sensor comprises conductive lines 14 parallel to the columns of array 10. In this example, in each column, all the pixels 100 in the column share the same conductive lines 14. Circuit 12 is then configured, for each column, to deliver the same signals TGi to all the pixels 100 in the column, via the conductive lines 14 of this column. As an example, for each column of pixels 100, the sensor comprises a row 14 for delivering signal TG1 to all the pixels in the column, and a row 14 of delivering signal TG2 to all the pixels in the column.

Sensor 1 further comprises a circuit 16 configured to control the reset devices 108 (FIG. 2) of pixels 100. During each integration phase common to all pixels, circuit 16 is configured to identically control all pixels 100. In other words, during each integration phase, circuit 16 is configured to deliver signals rst to pixels 100, these signals rst being identical for all the pixels 100 of array 10. More particularly, circuit 16 is configured so that no resetting of the areas memi of pixels 100 occurs during each integration phase, that, taking the example of the pixel 100 of FIG. 2, to maintain transistors 108i off due to signals rst, for the entire duration of each integration phase.

In the example of FIG. 1, the sensor comprises conductive lines 18 parallel to the rows of array 10. In this example, in each row of pixels 100, all the pixels 100 in the pixel row share the same conductive line(s) 18. Circuit 16 is then configured, for each row of pixels 100, to deliver the same signal rst to all the pixels 100 in the row, via the conductive line(s) 18 of this pixel row. As an example, in FIG. 1, sensor 1 comprises one line 18 per row of pixels 100.

As usual in iToF sensors, sensor 1 comprises a circuit 20 for reading from array 10. Circuit 20 is coupled, preferably connected, to lines Vxi to receive the output signals of pixels 100. In other words, circuit 20 is coupled, preferably connected, to lines Vxi to receive, for each pixel 100 of a pixel row being read, one or a plurality of signals representative of the state of each area memi of pixel 100 (FIG. 2). In the example of FIG. 1, although this is not shown, sensor 1 comprises one line Vx1 and one line Vx2 per column of pixels 100.

Although this is not shown in FIG. 1, and as is the case in usual iToF sensors, sensor 1 further comprises circuits configured to deliver the other control signals to pixels 100.

For example, sensor 1 comprises a circuit configured to control the readout devices of pixels 100, that is, the transistors 1161 and 1162 of each pixel 100 according to the example of FIG. 2. This readout control circuit is configured to deliver, to each row of pixels 100, the same readout control signals to all the pixels in the row. Thereby, during a readout phase, this circuit controls the reading of the pixel rows one after the others. In practice, sensor 1 then comprises conductive lines, other than lines 18, which are parallel to the rows of pixels 100 and configured to transmit the readout control signals from the readout control circuit to the pixels. In each row of pixels 100, all the pixels in the row of pixels 100 share the same conductive lines configured to transmit the readout control signals to the pixels 100 in this row of pixels 100.

For example, sensor 1 comprises a circuit configured to control the devices for resetting the areas PD of pixels 100, that is, the transistor 118 of each pixel 100 according to the example of FIG. 2. This readout control circuit is configured to deliver, to each column of pixels 100, the same signal ab to all the pixels in the row. In practice, sensor 1 then comprises conductive lines, other than lines 14, which are parallel to lines 14 and configured to transmit signals ab from the reset control circuit to the pixels. In this example where lines 14 are parallel to the columns of the array, in each column, all the pixels in the column of pixels 100 share the same conductive line configured to transmit signal ab.

To increase the distance range over which an iToF sensor of the type of that in FIG. 1 is capable of operating, that is, to determine a distance between a point of a scene to be captured and the sensor, it is here provided that, during an integration phase common to all the sensor pixels, at least certain pixels of the array integrate the light over a duration shorter than that of the integration phase. For this purpose, it is here provided to decrease, as compared with the duration of the integration phase, the duration of integration of light by at last certain pixels of the array, by stopping a phase of reset of the memory area of these pixels during the integration phase. Further, the duration of integration of light by other pixels of the array is maintained substantially equal to the duration of the integration phase, by stopping the phase of reset of the memory areas of these other pixels at the beginning of the integration phase.

This particularly enables to avoid using the technology comprising alternating first integration phases and second integration phases where the first integration phases have a first duration and the second integration phases have a second duration shorter than the first one. This technology, currently called sequential high dynamic range technology (sequential HDR) enables to increase the operating distance range of an iToF sensor but is highly motion-sensitive.

This also enables to avoid, for each pixel column, duplicating the lines 14 of this column so that, during each integration phase, a first part of these lines 14 controls pixels integrating light for a first duration and that a second part of these rows controls pixels integrating light for a second duration shorter than the first duration. Indeed, this would result in an increase in the sensor power consumption.

Embodiments and variants of iToF sensors will be described in relation with FIG. 3, FIG. 4, FIG. 5, FIG. 6, FIG. 8, FIG. 9, and FIG. 10, where, during each integration phase, a phase of reset of the memory areas of first pixels of the array is ended at the beginning of the integration phase, that is, at the time when the integration phase starts, and a phase of reset of the memory areas of second pixels of the array is ended during the integration phase. In these embodiments and variants, the circuit for controlling the devices for resetting the pixel areas memi is configured, during each integration phase implemented by the sensor, to order the end of the phase of reset of the memory areas of the first pixels at the beginning of the integration phase, and to order the end of the phase of reset of the memory areas of the second pixels of the array at a first time subsequent to the beginning of the integration phase. In other words, the circuit for controlling the devices for resetting the pixel memory areas memi is configured, during each integration phase implemented by the sensor, to order the end of the phase of reset of the memory areas of the first pixels at a second time prior to the first time.

Figures 3, 4:
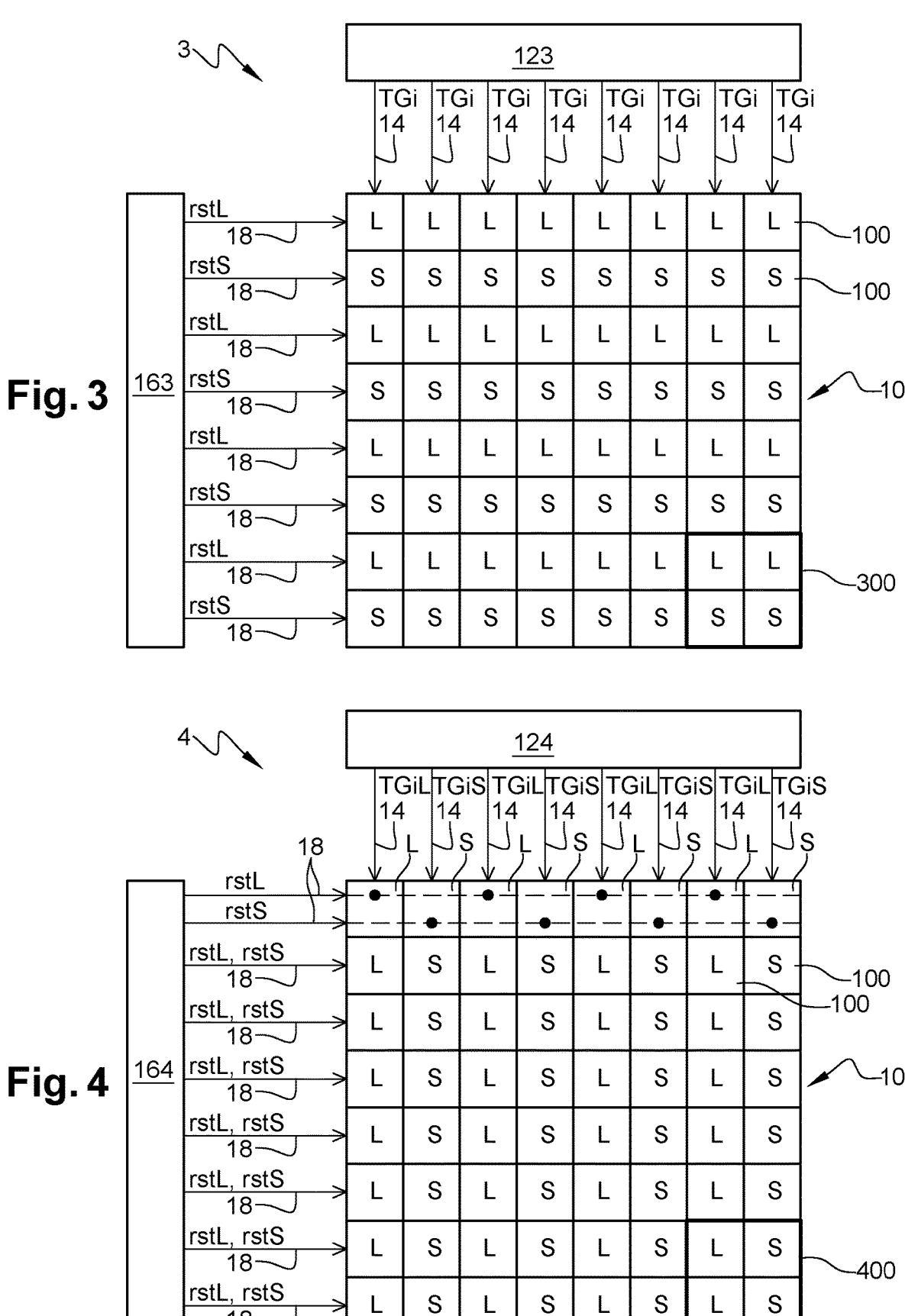
FIG. 3 schematically shows an embodiment of an iToF sensor.
FIG. 4 schematically shows another embodiment of an iToF sensor.

FIG. 3 schematically shows an embodiment of an iToF sensor 3. Sensor 3 comprises many functional and structural elements in common with the sensor 1 of FIG. 1, and only the differences between these two sensors are here highlighted. In FIG. 3, the case where each pixel 100 of array 10 is implemented as described in relation with FIG. 2, with two assemblies E1 and E2, is considered as an example.

In this embodiment, the array 10 of pixels 100 comprises first pixels 100 bearing reference L and second pixels bearing reference S. During each integration phase, pixels L are intended to have a light integration duration substantially equal, for example, equal, to the duration of the integration phase, pixels S being intended to have a light integration duration shorter than that of pixels L. Preferably, in this embodiment, array 10 only comprises pixels L and pixels S.

In this embodiment, circuit 16 is replaced with a circuit 163 configured to control the reset devices of pixels L, and the reset devices of pixels S. During each integration phase, circuit 163 is configured to control the reset devices 108 of pixels S and those of pixels L differently. In other words, during each integration phase, circuit 163 is configured to deliver signals rstL to pixels L and signals rstS to pixels S, signals rstL and rstS being different. Preferably, during each integration phase, signals rstL are identical for all pixels L, signals rstS being identical for all pixels S.

More particularly, during each integration phase, circuit 163 is configured to stop a reset of the areas memi of pixels L at the beginning of the integration phase, by means of signals rstL, and to stop a reset of the areas memi of pixels S at a first time subsequent to the beginning of the integration phase, but prior to the end thereof, by means of signals rstS.

As in FIG. 1, sensor 3 comprises conductive lines 18 parallel to the rows of array 10. Lines 18 are configured to transmit signals rstL and rstS to the pixels, respectively L and S.

In this embodiment, the rows of pixels 100 of array 10 comprise rows of pixels L and rows of pixels S. Each row of pixels L, respectively S, only comprises pixels L, respectively S. In each row of pixels 100, all the pixels 100 in the row of pixels share the same conductive line(s) 18. Circuit 163 is then configured, for each row of pixels L, respectively S, to deliver the same signal rstL, respectively rstS, to all the pixels L, respectively S, in the pixel row, via the corresponding conductive line(s) 18.

Preferably, rows of pixels L are alternated with rows of pixels S or, in other words, each row of pixels L is separated from a next row of pixels L by a row of pixels S. Thus, the layout of pixels L and S in array 10 corresponds to the repetition of a square pattern 300 with a two-pixel side length. Pattern 300 comprises two neighboring pixels L in a same row of pixels L and two neighboring pixels S of a same row of pixels S, the row of pixels L being adjacent to the row of pixels S.

Further, circuit 12 is here replaced with a circuit 123. Circuit 123 is configured to control the transfer devices 106*i* (FIG. 2) of pixels 100.

According to an embodiment, sensor 3 comprises conductive lines 14 parallel to the columns of array 10 and circuit 123 is configured to identically control, during each integration phase, all pixels 100. In each column, all the pixels 100 in the column then share the same conductive lines 4. Circuit 123 is configured, for each column, to deliver the same signals TGi to all the pixels 100 in the column, via the conductive lines 4 of this column. In this embodiment, during each integration phase, all pixels 100 receive the same signals TGi.

According to an alternative embodiment, not illustrated, lines 4 are parallel to the rows of pixels 100 of the array, and circuit 123 is configured to identically control, during each integration phase, all pixels 100. In each pixel row, all the pixels 100 in the pixel row then share the same conductive lines 4. Circuit 123 is configured, for each row of pixels 100, to deliver the same signals TGi to all the pixels 100 in the pixel row, via the conductive lines 4 of this pixel row. In this variant, during each integration phase, all pixels 100 receive the same signals TGi.

According to another alternative embodiment, not illustrated, lines 14 are parallel to the rows of pixels 100 of the array and circuit 123 is configured to control, during each integration phase, pixels L and pixels S differently. More particularly, circuit 123 is configured to control, during each integration phase, all the pixels L, respectively S, by means of signals TGiL, respectively TGiS. Preferably, during each integration phase, all the pixels L, respectively S, receive the same signals TGiL, respectively TGiS. In this variant, circuit 123 is configured so that, during each integration phase, signals TGiS are different from TGiL, and, more particularly, so that signals TGiS do not switch as long as the phase of reset of the transfer devices of pixels S is not over.

The above alternative embodiment enables to decrease the power consumption of sensor 3 with respect to the embodiments and variants where, during each integration phase, all pixels 100 are identically controlled by circuit 123.

Although the other control circuits of array 10, for example, the circuit configured to control the reading from pixels 100, and the circuit for controlling the resetting of the area PD of the pixels and, if present, the circuit for controlling the anti-blooming devices of pixels 100, have not been shown, these circuits are usual and, for example, similar to those of sensor 1 (FIG. 1), their implementation being within the abilities of those skilled in the art. Similarly, although this is not illustrated in FIG. 3, sensor 3 comprises readout circuit 20 and lines Vxi parallel to the columns of array 10.

FIG. 4 schematically shows another embodiment of an iToF sensor 4. Sensor 4 comprises many functional and structural elements in common with the sensor 3 of FIG. 3, and only the differences between these two sensors are here highlighted. In FIG. 4, the case where each pixel 100 of array 10 is implemented as described in relation with FIG. 2, with two assemblies E1 and E2, is considered as an example.

In this embodiment, the array 10 of pixels 100 comprises, as in FIG. 3, first pixels 100 bearing reference L and second pixels bearing reference S. Preferably, in this embodiment, array 10 only comprises pixels L and pixels S.

In this embodiment, circuit 163 is replaced with a circuit 164 configured to control the reset devices of pixels L, and the reset devices of pixels S. During each integration phase, circuit 164 is configured to control the reset devices 108 of pixels S and those of pixels L differently. In other words, during each integration phase, circuit 164 is configured to deliver signals rstL to pixels L and signals rstS to pixels S, signals rstL and rstS being different. Preferably, during each integration phase, signals rstL are identical for all pixels L, signals rstS being identical for all pixels S.

More particularly, during each integration phase, circuit 164 is configured to stop a reset of the areas memi of pixels L at the beginning of the integration phase, by means of signals rstL, and to stop a reset of the areas memi of pixels S at a first time subsequent to the beginning of the integration phase, but prior to the end thereof, by means of signals rstS.

As in FIG. 3, sensor 4 comprises conductive lines 18 parallel to the rows of pixels 100. Lines 18 are configured to transmit signals rstL and rstS to the pixels, respectively L and S.

In this embodiment, the columns of pixels 100 of array 10 comprise columns of pixels L and columns of pixels S. Each column of pixels L, respectively S, only comprises pixels L, respectively S. Circuit 163 is then configured to deliver the same signal rstL, respectively rstS, to all the pixels L, respectively S, of the pixel row, via the corresponding conductive line(s) 18. In particular, in this embodiment, for each row of pixels 100, sensor 4 comprises at least one line 18 configured to deliver signals rstL to the pixels L in the pixel row, and at least one line 18 configured to deliver signals rstS to the pixels S in the pixel row. As an example, as only illustrated for the row of pixels 100 arranged at the top of array 10 in FIG. 4, sensor 4 comprises, for each row of pixels 100, a line 18 configured to deliver signal rstL to the pixels L of this pixel row, and a line 18 configured to deliver signal rstS to the pixels S of this pixel row.

Preferably, the columns of pixel L are alternated with the columns of pixels S or, in other words, each column of pixels L is separated from a next column of pixels L by a column of pixels S. Thus, the layout of pixels L and S in array 10 corresponds to the repetition of a square pattern 400 with a two-pixel side length. Pattern 400 comprises two neighboring pixels L of a same column of pixels L and two neighboring pixels S of a same column of pixels S, the column of pixels L being adjacent to the column of pixels S.

Further, circuit 123 is here replaced with a circuit 124. Circuit 124 is configured to control the transfer devices 106*i* (FIG. 2) of pixels 100.

According to an embodiment, not illustrated, sensor 4 comprises conductive lines 14 parallel to the columns of array 10 and circuit 124 is configured to identically control, during each integration phase, all pixels 100. In each column, all the pixels 100 in the column then share the same conductive lines 14. Circuit 124 is configured, for each column, to deliver the same signals TGi to all the pixels 100 in the column, via the conductive lines 14 of this column. In this embodiment, during each integration phase, all pixels 100 receive the same signals TGi.

According to an alternative embodiment, illustrated in FIG. 4, lines 14 are parallel to the columns of pixels 100 of the array and circuit 124 is configured to control, during each integration phase, pixels L and pixels S differently. More particularly, circuit 124 is configured to control, during each integration phase, all the pixels L, respectively S, by means of signals TGiL, respectively TGiS. Preferably, during each integration phase, all the pixels L, respectively S, receive the same signals TGiL, respectively TGiS. In this variant, circuit 124 is configured so that, during each integration phase, signals TGiS are different from TGiL, and, more particularly, so that signals TGiS do not switch as long as the phase of reset of the transfer devices of pixels S is not over. This enables to decrease the power consumption of sensor 4 with respect to the embodiments and variants where, during each integration phase, all pixels 100 are identically controlled by circuit 124.

According to another alternative embodiment, not illustrated, lines 14 are parallel to the rows of pixels 100 of the array and circuit 124 is configured to identically control, during each integration phase, all pixels 100. In each pixel row, all the pixels 100 in the pixel row then share the same conductive lines 14. Circuit 124 is configured, for each row of pixels 100, to deliver the same signals TGi to all the pixels 100 in the pixel row, via the conductive lines 14 of this pixel row. In this variant, during each integration phase, all pixels 100 receive the same signals TGi.

Although the other control circuits of array 10, for example, the circuit configured to control the reading from pixels 100, and the circuit for controlling the resetting of the area PD of pixels 100 and, if present, the circuit for controlling the anti-blooming devices of pixels 100, have not been shown, these circuits are usual and, for example, similar to those of sensor 1 (FIG. 1), their implementation being within the abilities of those skilled in the art. Similarly, although this is not shown in FIG. 4, sensor 4 comprises readout circuit 20 and lines Vxi parallel to the columns of array 10.

Figures 5, 6:
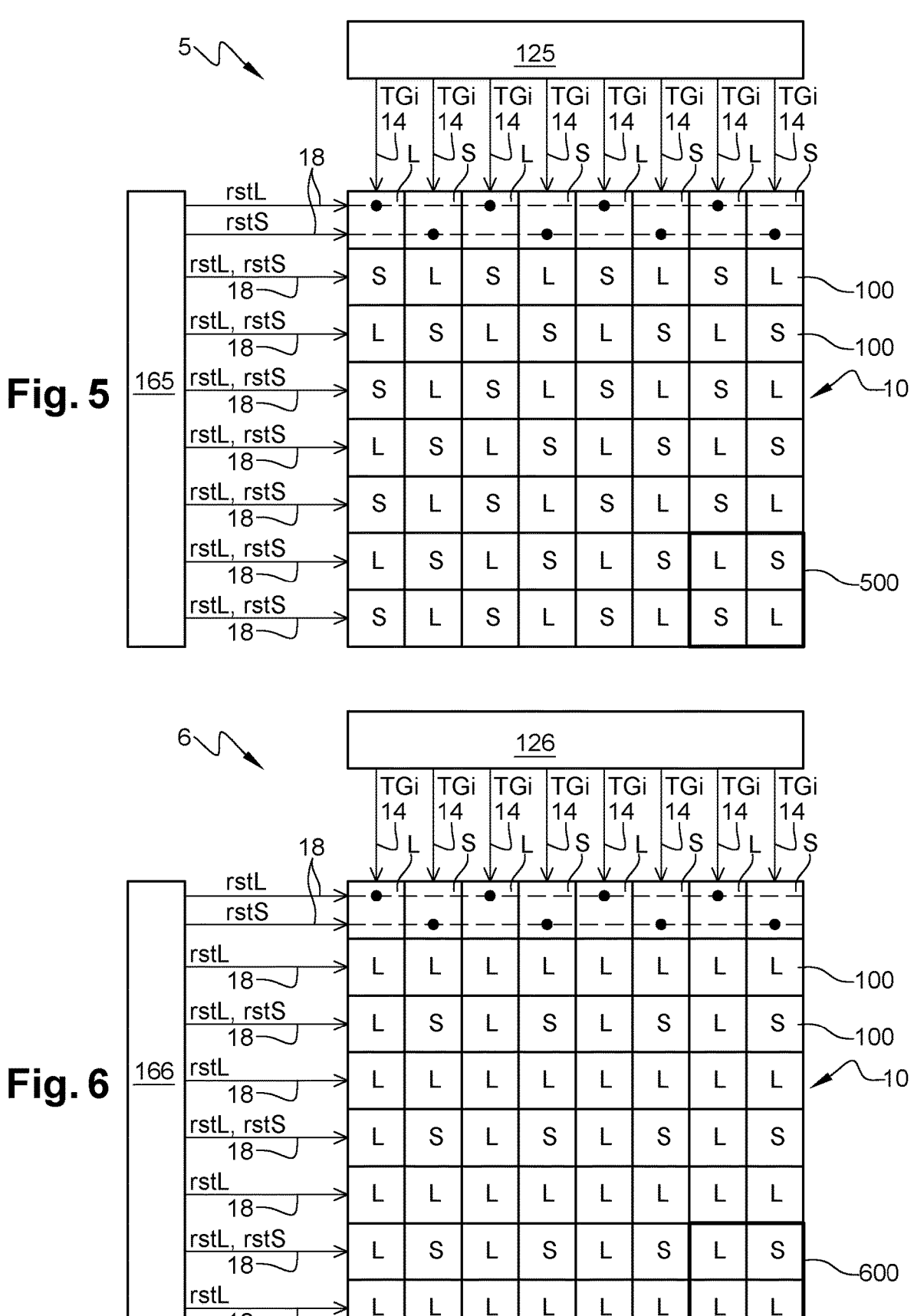
FIG. 5 schematically shows still another embodiment of an iToF sensor.
FIG. 6 schematically shows still another embodiment of an iToF sensor.

FIG. 5 schematically shows another embodiment of an iToF sensor 5. Sensor 5 comprises many functional and structural elements in common with the sensor 3 of FIG. 3, and only the differences between these two sensors are here highlighted. In FIG. 5, the case where each pixel 100 of array 10 is implemented as described in relation with FIG. 2, with two assemblies E1 and E2, is considered as an example.

In this embodiment, the array 10 of pixels 100 comprises, as in FIG. 3, first pixels 100 bearing reference L and second pixels bearing reference S. Preferably, in this embodiment, array 10 only comprises pixels L and pixels S.

In this embodiment, circuit 163 is replaced with a circuit 165 configured to control the reset devices of pixels L, and the reset devices of pixels S. During each integration phase, circuit 165 is configured to control the reset devices 108 of pixels S and those of pixels L differently or, in other words, to control pixels L and pixels S differently. In other words, during each integration phase, circuit 165 is configured to deliver signals rstL to pixels L and signals rstS to pixels S, signals rstL and rstS being different. Preferably, during each integration phase, signals rstL are identical for all pixels L, signals rstS being identical for all pixels S.

More particularly, during each integration phase, circuit 165 is configured to stop a reset of the areas memi of pixels L at the beginning of the integration phase, by means of signals rstL, and to stop a reset of the areas memi of pixels S at a first time subsequent to the beginning of the integration phase, but prior to the end thereof, by means of signals rstS.

As in FIG. 3, sensor 5 comprises conductive lines 18 parallel to the rows of array 10. Lines 18 are configured to transmit signals rstL and rstS to the pixels, respectively L and S.

In this embodiment, each column of pixels 100 of array 10 comprises an alternation of pixels L and of pixels S, and each row of pixels 100 comprises an alternation of pixels L and of pixels S. In other words, in each column of pixels 100, respectively row of pixels 100, each pixel L is separated from each next pixel L of this column, respective of this row, by a pixel S.

Thus, the layout of pixels L and S in array 10 corresponds to the repetition of a square pattern 500 having a two-pixel side length. Pattern 500 comprises two pixels L on a first diagonal of pattern 500 and two pixels S on a second diagonal of pattern 500.

For each row of pixels 100, circuit 163 is configured to deliver the same signal rstL, respectively rstS, to all the pixels L, respectively S, in the pixel row, via the corresponding conductive line(s) 18. In particular, in this embodiment, for each row of pixels 100, the sensor comprises at least one row 18 configured to deliver signals rstL to the pixels L of the pixel row, and at least one line 18 configured to deliver signals rstS to the pixels S in the pixel row. As an example, as only illustrated for the row of pixels 100 arranged at the top of array 10 in FIG. 5, sensor 5 comprises, for each row of pixels 100, a line 18 configured to deliver signal rstL to the pixels L of this pixel row, and a line 18 configured to deliver signal rstS to the pixels S of this pixel row.

Further, circuit 123 is here replaced with a circuit 125. Circuit 125 is configured to control the transfer devices 106*i* (FIG. 2) of pixels 100.

According to an embodiment illustrated in FIG. 5, sensor 5 comprises conductive lines 14 parallel to the rows of pixels 100 of array 10 and circuit 125 is configured to identically control, during each integration phase, all pixels 100. In each column, all the pixels 100 in the column then share the same conductive lines 14. Circuit 125 is configured, for each column, to deliver the same signals TGi to all the pixels 100 in the column, via the conductive lines 14 of this column. In this embodiment, during each integration phase, all pixels 100 receive the same signals TGi.

According to an alternative embodiment, not illustrated, sensor 5 comprises conductive lines 14 parallel to the pixel rows of array 10 and circuit 125 is configured to identically control, during each integration phase, all pixels 100. In each pixel row, all the pixels 100 in the column then share the same conductive lines 14. Circuit 125 is configured, for each row of pixels 100, to deliver the same signals TGi to all the pixels 100 in the row of pixels 100, via the conductive lines 14 of this pixel row. In this alternative embodiment, during each integration phase, all pixels 100 receive the same signals TGi.

Although the other control circuits of array 10, for example, the circuit configured to control the reading from pixels 100, and the circuit for controlling the resetting of the area PD of the pixels and, if present, the circuit for controlling the anti-blooming devices of pixels 100, have not been shown, these circuits are usual and, for example, similar to those of sensor 1 (FIG. 1), their implementation being within the abilities of those skilled in the art. Similarly, although this is not shown in FIG. 5, sensor 5 comprises readout circuit 20 and lines Vxi parallel to the columns of array 10.

FIG. 6 schematically shows another embodiment of an iToF sensor 6. Sensor 6 comprises many functional and structural elements in common with the sensor 5 of FIG. 5, and only the differences between these two sensors are here highlighted. In FIG. 6, the case where each pixel 100 of array 10 is implemented as described in relation with FIG. 2, with two assemblies E1 and E2, is considered as an example.

In this embodiment, the array 10 of pixels 100 comprises, as in FIG. 5, first pixels 100 bearing reference L and second pixels bearing reference S. Preferably, in this embodiment, array 10 only comprises pixels L and pixels S.

In this embodiment, circuit 165 is replaced with a circuit 166 configured to control the reset devices of pixels L, and the reset devices of pixels S. During each integration phase, circuit 165 is configured to control the reset devices 108 of pixels S and those of pixels L differently. In other words, during each integration phase, circuit 165 is configured to deliver signals rstL to pixels L and signals rstS to pixels S, signals rstL and rstS being different. Preferably, during each integration phase, signals rstL are identical for all pixels L, signals rstS being identical for all pixels S.

More particularly, during each integration phase, circuit 166 is configured to stop a reset of the areas memi of pixels L at the beginning of the integration phase, by means of signals rstL, and to stop a reset of the areas memi of pixels S at a first time subsequent to the beginning of the integration phase, but prior to the end thereof, by means of signals rstS.

In this embodiment, array 10 comprises first columns of pixels 100 and second columns of pixels 100, each first column only comprising pixels L and each second column comprising an alternation of pixels S and of pixels L.

Preferably, the first columns and the second columns are alternated or, in other words, each first column is separated from a next first column by a second column. Preferably, similarly to the columns, array 10 comprises first rows of pixels 100 and second rows of pixels 100, each first pixel row only comprising pixels L and each second pixel row comprising an alternation of pixels S and of pixels L. Preferably, the first rows and the second rows are alternated. The layout of the pixels L and S in array 10 then corresponds to the repetition of a square pattern 600 having a two-pixel side length. Pattern 600 comprises three pixels L and one pixel S.

As in FIG. 5, sensor 6 comprises conductive lines 18 parallel to the rows of pixels 100. Lines 18 are configured to transmit signals rstL and rstS to the pixels, respectively L and S. Circuit 166 is then configured to deliver the same signal rstL, respectively rstS, to all the pixels L, respectively S, in the pixel row, via the corresponding conductive line(s) 18. In particular, in this embodiment, for each second row of pixels S and L, sensor 6 comprises at least one line 18 configured to deliver signals rstL to the pixels L of this second pixel row, and at least one line 18 configured to deliver signals rstS to the pixels S of this second pixel row. Further, since array 10 comprises first rows only comprising pixels L, it is not useful to provide conductive lines 14 configured to transmit signals rstS to the pixels L of these first pixel rows.

Further, circuit 125 is here replaced with a circuit 126. Circuit 126 is configured to control the transfer devices 106*i* (FIG. 2) of pixels 100.

According to an embodiment illustrated in FIG. 6, sensor 6 comprises conductive lines 14 parallel to the rows of pixels 100 of the array and circuit 126 is configured to identically control, during each integration phase, all pixels 100. In each column, all the pixels 100 in the column then share the same conductive lines 14. Circuit 126 is configured, for each column, to deliver the same signals TGi to all the pixels 100 in the column, via the conductive lines 14 of this column. During each integration phase, all pixels 100 receive the same signals TGi. In an alternative embodiment (not illustrated), conductive lines 14 are parallel to the pixel rows of array 10 and circuit 126 is configured to identically control, during each integration phase, all pixels 100.

In another embodiment, not illustrated, the first columns and the first rows of array 10 only comprise pixels S rather than pixels L, and pattern 600 for example comprises three pixels S and one pixel L. In this other embodiment, for each second row of pixels S and L, sensor 6 comprises at least one line 18 configured to deliver signals rstL to the pixels L of this second row of pixels, and at least one line 18 configured to deliver signals rstS to the pixels S of this second pixel row and, for each first pixel row only comprising pixels S, it is not useful to provide conductive lines 14 configured to transmit signals rstL to the pixels S of these first pixel rows. In this other embodiment, circuit 126 is configured to control, during each integration phase:

all the pixels of the array with the same signals TGi, be lines 14 parallel to the rows of the array or to the columns of the array; or the pixels S of the first columns with signals TGiS and the pixels S and L of the second columns with signals TGiL when lines 14 are parallel to the columns of the array; or the pixels S of the first pixel rows with signals TGiS and the pixels S and L of the second pixel rows with signals TGiL when lines 14 are parallel to the pixel rows of the array.

Although the other control circuits of array 10, for example, the circuit configured to control the reading from pixels 100, and the circuit for controlling the resetting of the area PD of the pixels and, if present, the circuit for controlling the anti-blooming devices of pixels 100, have not been shown, these circuits are usual and, for example, similar to those of sensor 1 (FIG. 1), their implementation being within the abilities of those skilled in the art. Similarly, although this is not shown in FIG. 6, sensor 6 comprises readout circuit 20 and lines Vxi parallel to the columns of array 10.

Figure 7:
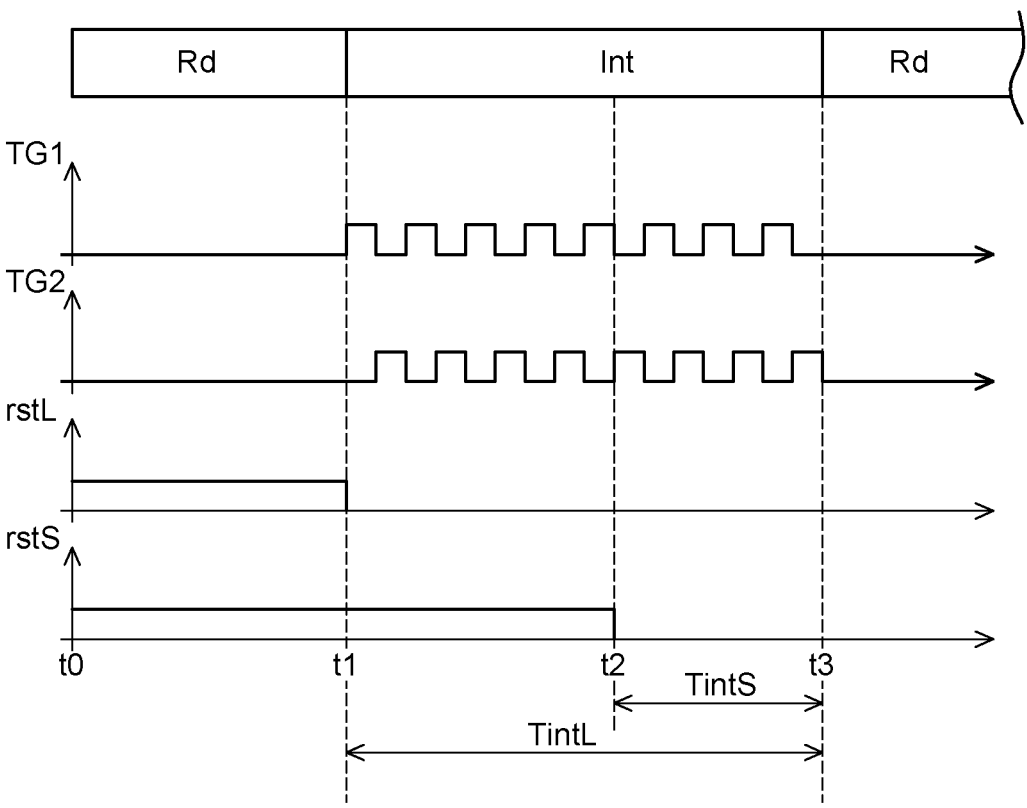
FIG. 7 illustrates in timing diagrams the operation of an iToF sensor according to an embodiment.

FIG. 7 illustrates, in timing diagrams, the operation of an iToF sensor according to an embodiment. More particularly, FIG. 7 illustrates the operations of the previously-described sensors 3, 4, 5, and 6, in the case where the circuits, respectively 123, 124, 125, and 126 are configured, during each integration phase, to identically control all pixels, that is, with the same signals TGi.

FIG. 7 illustrates the signals TGi delivered to each pixel of the array, the signal rstL delivered to each pixel L of the array, and the signal rstS delivered to each pixel S of the array. More particularly, in this example, a pixel 100 comprising 2 assemblies E1 and E2 is considered (FIG. 2). Thus, in this example, each pixel 100 receives a signal TG1 and a signal TG2, and all pixels 100 receive the same signal TG1 and the same signal TG2.

At a time t0, the sensor is in a readout phase Rd. The transfer devices of pixels 100 are maintained off. For example, signals TG1 and TG2 are in a first binary state, for example corresponding to a low level, for which the transfer devices of pixels 100 are off.

Further, at time t0, all pixels 100 have been read and a phase of reset of the areas mem1 and mem2 of all pixels 100 is ongoing. For this purpose, signals rstS and rstL are in a first binary state, for example corresponding to a high level, for which the reset devices 108*i* of the areas memi of pixels 100 are active (FIG. 2).

At a time t1 subsequent to time t0, an integration phase Int common to all pixels 100 starts. As a result, circuit 163, 164, 165, or 166, according to the case, orders the end of the phase of reset of the memory areas memi of pixels L. For this purpose, signal rstL is switched to its second binary state, for example corresponding to a low level, for which the devices 108 of pixels L are inactive.

From time t1 and until a time t3 subsequent to time t1 and corresponding to the end of the integration phase, and as conventional in usual iToF sensors, signals TG1 and TG2 are periodically switched between their two binary stats, so that their transfer devices 1061 and 1062 periodically switch between their off and on states.

At a time t2, between times t1 and t3, circuit 163, 164, 165, or 166, according to the case, orders the end of the phase of reset of the memory areas memi of pixels S. For this purpose, signal rstS is switched to its second binary state, for example corresponding to a low level, for which the devices 108 of pixels S are inactive. Due to the fact that the reset of the areas memi of pixels S ends at time t2, all that has occurred in pixels S between time t1 and t2 is not taken into account. In other words, from the point of view of pixels S, the integration phase only really starts at time t2.

Pixels L thus integrate light for the entire duration TintL of the integration phase (from time t1 to time t3) while pixels S integrate light over a duration TintS (from time t2 to time t3) shorter than duration TintL.

From time t3, a new readout phase Rd starts.

Figure 8:
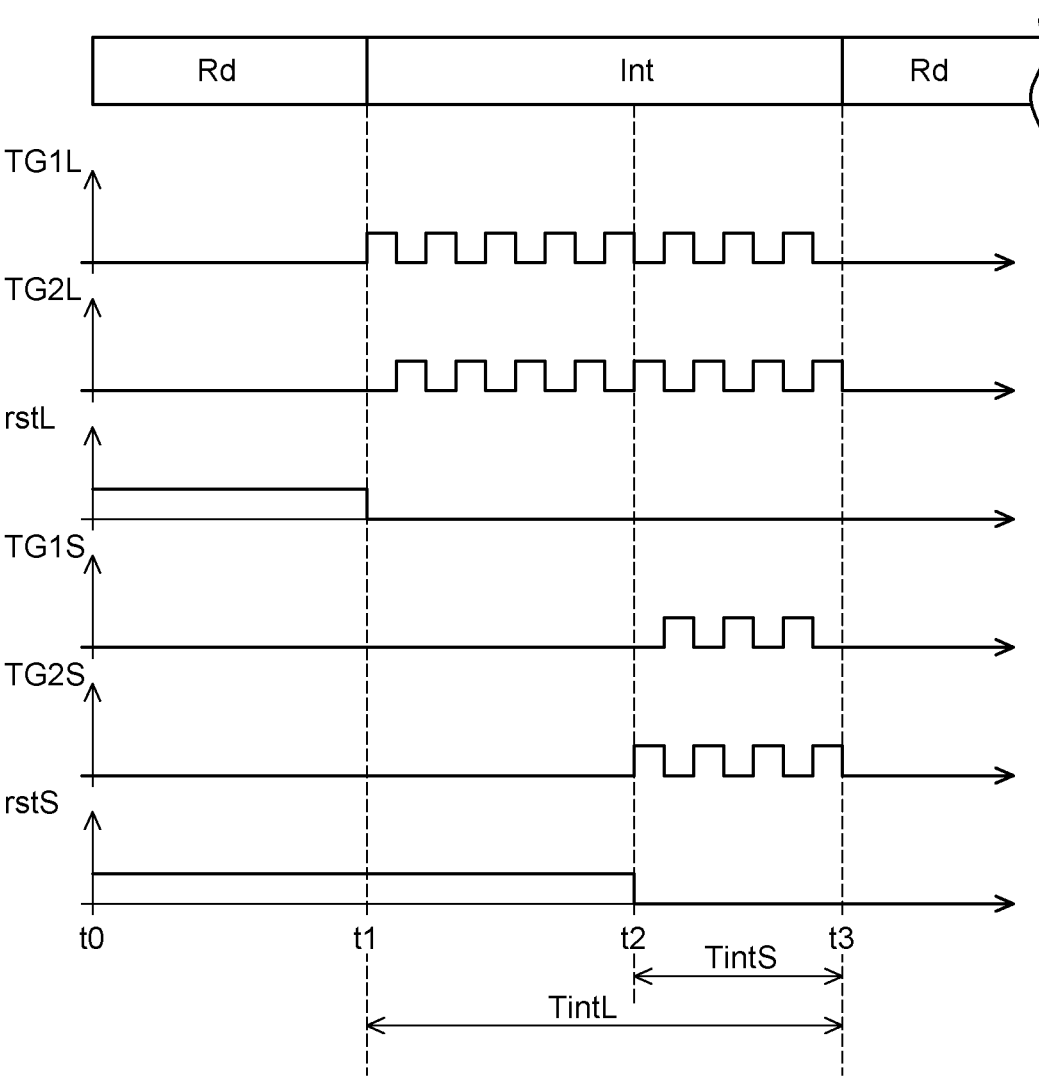
FIG. 8 illustrates in timing diagrams the operation of an iToF sensor according to another embodiment.

FIG. 8 illustrates, in timing diagrams, the operation of an iToF sensor according to another embodiment. More particularly, FIG. 8 illustrates the operation of the previously-described sensors 3, 4, and 6, in the case where the circuits, respectively 123, 124, and 126 are configured, during each integration phase, to control all pixels L with signals TGiL and all pixels S with signals TGiS, pixels L all receiving the same signals TGiL and pixels S all receiving the same signals TGiS.

FIG. 8 illustrates the signals TGiL delivered to each pixel L of the array, the signals TGiS delivered to each pixel S of the array, the signal rstL delivered to each pixel L of the array, and the signal rstS delivered to each pixel S of the array. More particularly, in this example, a pixel 100 comprising 2 assemblies E1 and E2 is considered (FIG. 2). Thus, in this example, each pixel L, respectively S, receives a signal TGiL, respectively TG1S, and a signal TG2L, respectively TG2S.

At a time t0, the sensor is in a readout phase Rd. The transfer devices of pixels 100 are maintained off. For example, signals TG1L, TG2L, TG1S, and TG2S are in a first binary state, for example corresponding to a low level, for which the transfer devices of pixels 100 are off.

Further, at time t0, all pixels 100 have been read and a phase of reset of the areas mem1 and mem2 of all pixels 100 is ongoing. For this purpose, signals rstS and rstL are in a first binary state, for example corresponding to a high level, for which the reset devices 108 of the areas memi of pixels 100 are active (FIG. 2).

At a time t1 subsequent to time t0, an integration phase Int common to all pixels 100 starts. As a result, circuit 163, 164, or 166, according to the case, orders the end of the phase of reset of the memory areas memi of pixels L For this purpose, signal rstL is switched to its second binary state, for example corresponding to a low level, for which the devices 108 of pixels L are inactive.

From time t1, and until a time t3 subsequent to time t1 and corresponding to the end of the integration phase, signals TG1L and TG2L are periodically switched between their two binary states, so that the transfer devices 106i and 1062 of pixels L periodically switch between their off and on states.

At a time t2 between times t1 and t3, circuit 163, 164, 165, or 166, according to the case, orders the end of the phase of reset of the memory areas memi of pixels S. For this purpose, signal rstS is switched to its second binary state, for example corresponding to a low level, for which the devices 108 of pixels S are inactive. Further, to avoid an unnecessary power consumption, due to the fact that the duration of integration Tints (between time t2 and time t3) of light by pixels S only starts at time t2, between times t1 and t3, signals TG1S and TG2S are maintained in the first binary state, and only periodically switch between their first and second binary states from time t2, until time t3.

From time t3, a new readout phase Rd starts.

Figure 9:
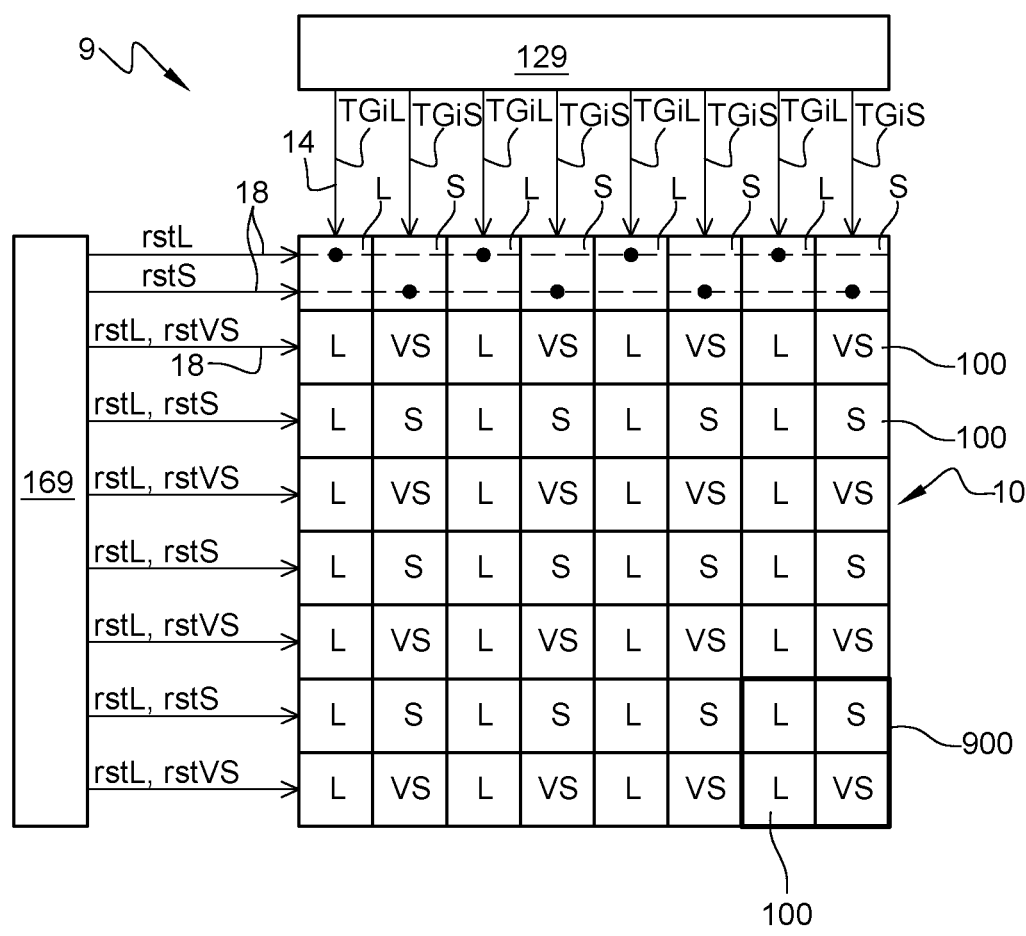
FIG. 9 schematically shows still another embodiment of an iToF sensor.

FIG. 9 schematically shows another embodiment of an iToF sensor 9. Sensor 9 comprises many functional and structural elements in common with the sensor 1 of FIG. 1, and only the differences between these two sensors are here highlighted. In FIG. 9, the case where each pixel 100 of array 10 is implemented as described in relation with FIG. 2, with two assemblies E1 and E2, is considered as an example.

In this embodiment, the array 10 of pixels 100 comprises first pixels 100 bearing reference L, second pixels bearing reference S, but also third pixels bearing reference VS. During each integration phase, pixels L are intended to have a light integration duration substantially equal, for example, equal, to the duration of the integration phase, pixels S being intended to have a light integration duration shorter than that of pixels L, and pixels VS being intended to have a light integration duration shorter than that of pixels S. Preferably, in this embodiment, array 10 only comprises pixels L, S, and VS.

In this embodiment, circuit 16 is replaced with a circuit 169 configured to control the devices for resetting the areas memi of pixels L, the devices for resetting the areas memi of pixels S, and the devices for resetting the areas memi of pixels VS. During each integration phase, circuit 169 is configured to control the reset pixels 108 of pixels L, those of pixels S, and those of pixels VS differently. In other words, during each integration phase, circuit 169 is configured to deliver signals rstL to pixels L, signals rstS to pixels S, and signals rstVS to pixels VS, signals rstL, rstS, and rstVS being different. Preferably, during each integration phase, signals rstL are identical for all pixels L, signals rstS being identical for all pixels S, and signals rstVS being identical for all pixels VS.

More particularly, during each integration phase, circuit 169 is configured to stop a reset of the areas memi of pixels L at the beginning of the integration phase, by means of signals rstL, to stop a reset of the areas memi of pixels S at a first time subsequent to the beginning of the integration phase, by means of signals rstS, and to stop a reset of the areas memi of pixels VS at a second time subsequent to the first time, by means of signals rstVS.

As in FIG. 1, sensor 9 comprises conductive lines 18 parallel to the rows of array 10. Lines 18 are configured to transmit signals rstL, rstS, and rstVS to the pixels, respectively L, S, and VS.

In first examples of embodiments illustrated in FIG. 9, the columns of pixels 100 of array 10 comprise columns of pixels L and columns of pixels S and VS. Each column of pixels L only comprises pixels L, each column of pixels S and VS only comprising pixels S and VS. Preferably, the columns of pixels L are alternated with the columns of pixels S and VS. As an example, in each column of pixels S and VS, pixels S may be alternated with pixels VS, or even pairs of pixels S may be alternated with pairs of pixels VS.

Further, in these first examples of embodiment, the pixel rows of the array comprise rows of pixels L and VS and rows of pixels L and S. Thus, in these first examples, sensor 9 comprises:

for each row of pixels L and S, one or a plurality of rows 18 configured to transmit signals rstL to the pixels L of the pixel row, and one or a plurality of lines 18 configured to transmit signals rstS to the pixels S of the pixel row, and for each rows of pixels L and VS, one or a plurality of lines 18 configured to transmit signals rstL to the pixels L of the pixel row, and one or a plurality of lines 18 configured to transmit signals rstVS to the pixels VS of the pixel row.

In the example illustrated in FIG. 9, the layout of pixels L, S, and VS in array 10 corresponds to the repetition of a square pattern goo having a two-pixel side length. Pattern 900 comprises two neighboring pixels L of a same column of pixels L and two neighboring pixels S and VS of a same column of pixels S and VS, the column of pixels L being adjacent to the column of pixels S and VS.

In the embodiment of FIG. 9, circuit 12 is replaced with a circuit 129. Circuit 129 is configured to control the transfer devices 106$i$ (FIG. 2) of pixels 100.

According to an embodiment (not illustrated), sensor 9 comprises conductive lines 14 parallel to the pixel columns of array 10 and circuit 129 is configured to identically control, during each integration phase, all pixels 100. In each column, all the pixels 100 in the column then share the same conductive lines 14. Circuit 129 is configured, for each column, to deliver the same signals TGi to all the pixels 100 in the column, via the conductive lines 14 of this column. In this embodiment, during each integration phase, all pixels 100 receive the same signals TGi.

According to an alternative embodiment (not illustrated), lines 14 are parallel to the rows of pixels 100 of the array and circuit 129 is configured to identically control, during each integration phase, all pixels 100. In each pixel row, all the pixels 100 in the pixel row then share the same conductive lines 14. Circuit 129 is configured, for each row of pixels 100, to deliver the same signals TGi to all the pixels 100 in the pixel row, via the conductive lines 14 of this pixel row. In this variant, during each integration phase, all pixels 100 receive the same signals TGi.

According to another alternative embodiment, illustrated in FIG. 9, lines 14 are parallel to the columns of pixels 100 of the array and circuit 129 is configured to control, during each integration phase, all pixels L, respectively S and VS, by means of signals TGiL, respectively TGiS. Preferably, during each integration phase, all pixels S, respectively S and VS, receive the same signals TGiL, respectively TGiS. In this variant, circuit 129 is configured so that, during each integration phase, signals TGiS are different from TGiL, and, more particularly, so that signals TGiS do not switch as long as the phase of reset of the transfer devices of pixels S is not over.

First examples where the array comprises columns of pixels L and columns of pixels S and VS have been described hereabove in relation with FIG. 9.

In second examples of embodiments, not illustrated, array 10 comprises rows of pixels L and rows of pixels S and VS, each row of pixels L only comprising pixels L and each row of pixels S and VS only comprising pixels S and VS. Preferably the rows of pixels L are alternated with the rows of pixels S and VS. As an example, in each row of pixels S and VS, pixels S may be alternated with pixels VS, or even pairs of pixels S may be alternated with pairs of pixels VS. Sensor 9 then comprises:

for each row of pixels L, one or a plurality of lines 18 configured to transmit signals rstL to the pixels L of the pixel row, and for each rows of pixels S and VS, one or a plurality of lines 18 configured to transmit signals rstS to the pixels S of the pixel row, and one or a plurality of lines 18 configured to transmit signals rstVS to the pixels VS of the pixel row.

Further, in these second examples of embodiments, circuit 129 is configured to deliver the same signals TGi to all the pixels in the array, by means of lines 14 parallel to the pixel rows of the array, or by means of lines 14 parallel to the pixel columns of the array. As a variant, when lines 14 are parallel to the pixel rows of the array, circuit 129 is configured to deliver, for each row of pixels L, the same signals TGiL to all the pixels L of the row of pixels L, and, for each row of pixels S and VS, the same signals TGiS to all the pixels S and VS of the row of pixels S and VS.

Although the other control circuits of array 10, for example, the circuit configured to control the reading from pixels 100, and the circuit for controlling the resetting of the area PD of the pixels and, if present, the circuit for controlling the anti-blooming devices of pixels 100, have not been shown, these circuits are usual and, for example, similar to those of sensor 1 (FIG. 1), their implementation being within the abilities of those skilled in the art. Similarly, although this is not shown in FIG. 9, sensor 9 comprises readout circuit 20 and lines Vxi parallel to the columns of array 10.

Figure 10:
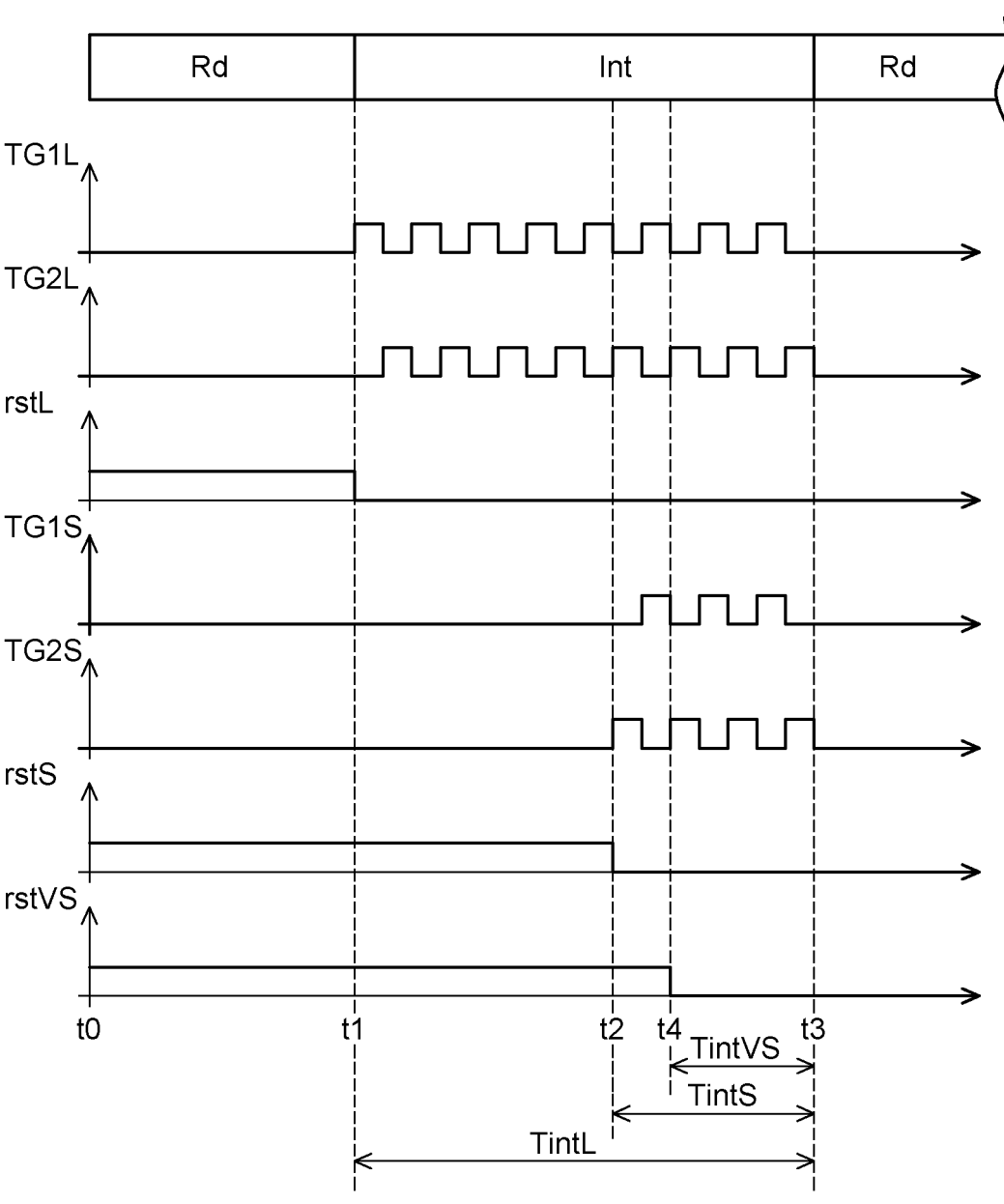
FIG. 10 illustrates, in timing diagrams, the operation of the sensor of FIG. 9.

FIG. 10 illustrates, in timing diagrams, the operation of the sensor of FIG. 9. More particularly, FIG. 10 illustrates the operation of the previously-described sensor 9, in the case where circuit 129 is configured, during each integration phase, to control all pixels L identically, that is, with the same signals TGiL, and all pixels S and VS identically, that is, with signals TGiS, pixels L being controlled differently from pixels S and VS by circuit 129 or, in other words, signals TGiL being different from signals TGiS.

FIG. 10 illustrates the signals TGiL and rstL delivered to each pixel L of the array, the signals TGiS delivered to each pixel S of the array and to each pixel VS of the array, the signal rstS delivered to each pixel S of the array, and the signal rstVS delivered to each pixel VS of the array. In this example, a pixel 100 comprising two assemblies E1 and E2 is considered (FIG. 2).

At a time t0, the sensor is in a readout phase Rd. The transfer devices of pixels 100 are maintained off. For example, signals TG1L, TG2L, TG1S, and TG2S are in a first binary state, for example corresponding to a low level, for which the transfer devices of pixels 100 are off.

Further, at time t0, all pixels 100 have been read and a phase of reset of the areas mem1 and mem2 of all pixels 100 is ongoing. For this purpose, signals rstL, rstS, and rstVS are in a first binary state, for example corresponding to a high level, for which the reset devices 108 of the areas mem$i$ of pixels 100 are active (FIG. 2).

At a time t1 subsequent to time t0, an integration phase Int common to all pixels 100 starts. As a result, circuit 169 orders the end of the phase of reset of the memory areas mem$i$ of pixels L For this purpose, signal rstL is switched to its second binary state, for example corresponding to a low level, for which the devices 108 of pixels L are inactive.

From time t1, and until a time t3 subsequent to time t1 and corresponding to the end of the integration phase, signals TG1L and TG2L are periodically switched between their two binary states, so that their transfer devices 1061 and 1062 periodically switch between their off and on states.

At a time t2, between times t1 and t3, circuit 169 orders the end of the phase of reset of the memory areas mem$i$ of pixels S. For this purpose, signal rstS is switched to its second binary state, for example corresponding to a low level, for which the devices 108 of pixels S are inactive. Further, from time t2, and until a time t3 corresponding to the end of the integration phase, signals TG1S and TG2S are periodically switched between their two binary states, so that the transfer devices 106*i* and 1062 of pixels S and VS periodically switch between their off and on states.

At a time t4 between times t2 and t3, circuit 169 orders the end of the phase of reset of the memory areas memi of pixels VS. For this purpose, signal rstVS is switched to its second binary state, for example corresponding to a low level, for which the devices 108 of pixels VS are inactive.

From time t3, a new readout phase Rd starts.

Pixels L thus integrate light for the entire duration TIntL of the integration phase (from time t1 to time t3) while pixels S integrate light over a duration TintS (from time t2 to time t3) shorter than duration TntL, and pixels VS integrate light over a duration TintVS (from time t4 to time t3) shorter than duration TIntS.

It will be within the abilities of those skilled in the art to deduce from the operation described hereabove in relation with FIG. 10 the operation of sensor 9 in the case where circuit 129 controls all pixels 100 in the same way, that is, with the same signals TGi for all pixels 100.

Preferably, in all the embodiments and variants previously described in relation with FIG. 3, FIG. 4, FIG. 5, FIG. 6, FIG. 7, FIG. 8, FIG. 9, and FIG. 10, when a row, respectively a column, of pixels 100 comprises pixels of two types, that is, pixels L and pixels S or pixels L and pixels VS, or also pixels S and pixels VS, there are as many pixels of the first one of the two types as pixels of the second one of the two types.

Further, in all the previously-described examples of embodiments and of variants of sensors, it should be noted that, as compared with a usual sensor of the type of that in FIG. 1, the number of conductive lines 14 is not duplicated. Preferably, the number of conductive lines 14 of the described sensors 3, 4, 5, 6, and 9 is equal to that of a corresponding sensor 1, that is, of a sensor 1 having pixels structurally identical to those of sensors 3, 4, 5, 6, and 9.

Further, the embodiments and variants described hereabove apply to pixels that may be different from the pixel 100 described in relation with FIG. 2, particularly by the number N of assemblies Ei comprised by these pixels and/or by the implementation of the devices for resetting the memory areas memi of these pixels, and/or by the implementation of the readout circuit of these pixels, and/or by the implementation of the device for resetting the area PD of these pixels, and/or by the implementation of the anti-blooming device of these pixels. More generally, the described embodiments and variants apply to any usual iToF pixel comprising a photosensitive area, at least two assemblies, each comprising a memory area and a transfer device between area PD and the memory area, and a device for resetting the memory areas.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

What is claimed is:

1. An indirect time-of-flight sensor comprising:
an array of pixels organized in rows and in columns, each pixel comprising:
a photoconversion area;

at least two assemblies, each comprising a memory area and a transfer device coupling the memory area to the photoconversion area; and
a device for resetting the memory areas of the pixel;
a first circuit configured to control the transfer devices of the pixels; and
a second circuit configured to control the devices for resetting the memory areas of the pixels,
wherein the second circuit is configured, during each integration phase implemented by the indirect time-of-flight sensor, to order an end of a phase of reset of the memory areas of first pixels of the array at a beginning of the integration phase, and to order an end of a phase of reset of the memory areas of second pixels of the array at a first time subsequent to the beginning of the integration phase, wherein the first pixels and the second pixels undergo different integration durations within the integration phase.

2. The sensor of claim 1, wherein:
the second circuit is configured to control the devices for resetting the memory areas of the first pixels by means of first reset signals and the devices for resetting the memory areas of the second pixels by means of second reset signals; and
the indirect time-of-flight sensor comprises conductive lines parallel to the rows of pixels and configured to transmit the first and second reset signals to the pixels of the array.

3. The sensor of claim 2, wherein:
the second circuit is further configured, during each integration phase, to order the end of a phase of reset of the memory areas of third pixels of the array at a second time subsequent to the first time; and
the second circuit is configured to control the devices for resetting the memory areas of the third pixels by means of third reset signals.

4. The sensor of claim 3, wherein:
the columns of pixels comprise alternating first columns and second columns;
each first column only comprises the first pixels;
each second column only comprises alternating the second pixels and third pixels;
the first circuit is configured to control the transfer devices of each first pixel by means of first transfer signals, and the transfer devices of each second pixel and of each third pixel by means of second transfer signals; and
the indirect time-of-flight sensor comprises second conductive lines parallel to the columns of pixels and configured to transmit the first and the second transfer signals to the pixels of the array.

5. The sensor of claim 3, wherein:
the rows of pixels comprise alternating first rows and second rows;
each first row only comprises the first pixels;
each second row only comprises alternating the second pixels and third pixels;
the first circuit is configured to control the transfer devices of each first pixel by means of first transfer signals, and the transfer devices of each second pixel and of each third pixel by means of second transfer signals; and
the indirect time-of-flight sensor comprises second conductive lines parallel to the rows of pixels and configured to transmit the first and the second transfer signals to the pixels of the array.

6. An indirect time-of-flight sensor comprising:
an array of pixels organized in rows and in columns, each pixel comprising:

a photoconversion area;

at least two assemblies, each comprising a memory area and a transfer device coupling the memory area to the photoconversion area; and a device for resetting the memory areas of the pixel;

a first circuit configured to control the transfer devices of the pixels; and a second circuit configured to control the devices for resetting the memory areas of the pixels, wherein the second circuit is configured, during each integration phase implemented by the indirect time-of-flight sensor, to order an end of a phase of reset of the memory areas of first pixels of the array at a beginning of the integration phase, and to order an end of a phase of reset of the memory areas of second pixels of the array at a first time subsequent to the beginning of the integration phase, wherein the rows of pixels comprise alternating first rows and second rows, each first row only comprising the first pixels and each second row only comprising the second pixels.

7. The sensor of claim 6, wherein the first circuit is configured, during each integration phase, to identically control all the pixels of the array.

8. The sensor of claim 6, wherein:

the first circuit is configured to control the transfer devices of each first pixel by means of first transfer signals and the transfer devices of each second pixel by means of second transfer signals; and the indirect time-of-flight sensor comprises conductive lines parallel to the rows of pixels and configured to transmit the first and second transfer signals to the pixels of the array.

9. The sensor of claim 1, wherein the columns of pixels comprise alternating first columns and second columns, each first column only comprising the first pixels and each second column only comprising the second pixels.

10. The sensor of claim 9, wherein the first circuit is configured, during each integration phase, to identically control all the pixels of the array.

11. The sensor of claim 9, wherein:

the first circuit is configured to control the transfer devices of each first pixel by first transfer signals and the transfer devices of each second pixel by second transfer signals; and the indirect time-of-flight sensor comprises conductive lines parallel to the columns of the array and configured to transmit the first and the second transfer signals to the pixels of the array.

12. The sensor of claim 1, wherein each column of pixels comprises a first alternation of the first pixels and of the second pixels, and each row of pixels comprises a second alternation of the first pixels and of the second pixels.

13. The sensor of claim 12, wherein the first circuit is configured, during each integration phase, to identically control all the pixels of the array.

14. The sensor of claim 1, wherein the columns of pixels comprise alternating first columns and second columns, each first column only comprising the first pixels or the second pixels, and each second column comprising an alternation of the first pixels and of the second pixels.

15. The sensor of claim 1, wherein all the pixels of the array are identical.

16. A method of operating an indirect time-of-flight sensor comprising an array of pixels organized in rows and in columns, the method comprising:

controlling, by a first circuit, transfer devices of the pixels of the indirect time-of-flight sensor, each pixel of the array comprising at least two assemblies, each assembly comprising a memory area and a transfer device coupling the memory area to a photoconversion area of the pixel;

controlling, by a second circuit, devices for resetting memory areas of the pixels; and during each integration phase implemented by the indirect time-of-flight sensor:

ordering, by the second circuit, an end of a phase of reset of the memory areas of first pixels of the array at a beginning of the integration phase; and ordering, by the second circuit, an end of a phase of reset of the memory areas of second pixels of the array at a first time subsequent to the beginning of the integration phase, wherein the first pixels and the second pixels undergo different integration durations within the integration phase.

17. The method of claim 16, further comprising:

controlling, by the second circuit, the devices for resetting the memory areas of the first pixels by first reset signals and the devices for resetting the memory areas of the second pixels by second reset signals; and transmitting, by conductive lines parallel to the rows of pixels, the first and second reset signals to the pixels of the array.

18. The method of claim 17, further comprising:

ordering, by the second circuit during each integration phase, the end of a phase of reset of the memory areas of third pixels of the array at a second time subsequent to the first time; and controlling, by the second circuit, the devices for resetting the memory areas of the third pixels by third reset signals.

19. The method of claim 18, wherein the columns of pixels comprise alternating first columns and second columns, each first column only comprises the first pixels, and each second column only comprises alternating the second pixels and the third pixels, and the method further comprises:

controlling, by the first circuit, the transfer devices of each first pixel by first transfer signals, and the transfer devices of each second pixel and of each third pixel by second transfer signals; and transmitting, by second conductive lines parallel to the columns of pixels, the first and the second transfer signals to the pixels of the array.

20. The method of claim 18, wherein the rows of pixels comprise alternating first rows and second rows, each first row only comprises the first pixels, and each second row only comprises alternating the second pixels and the third pixels, and the method further comprises:

controlling, by the first circuit, the transfer devices of each first pixel by first transfer signals, and the transfer devices of each second pixel and of each third pixel by second transfer signals; and transmitting, by second conductive lines parallel to the rows of pixels, the first and the second transfer signals to the pixels of the array.

* * * * *